Figure 1:
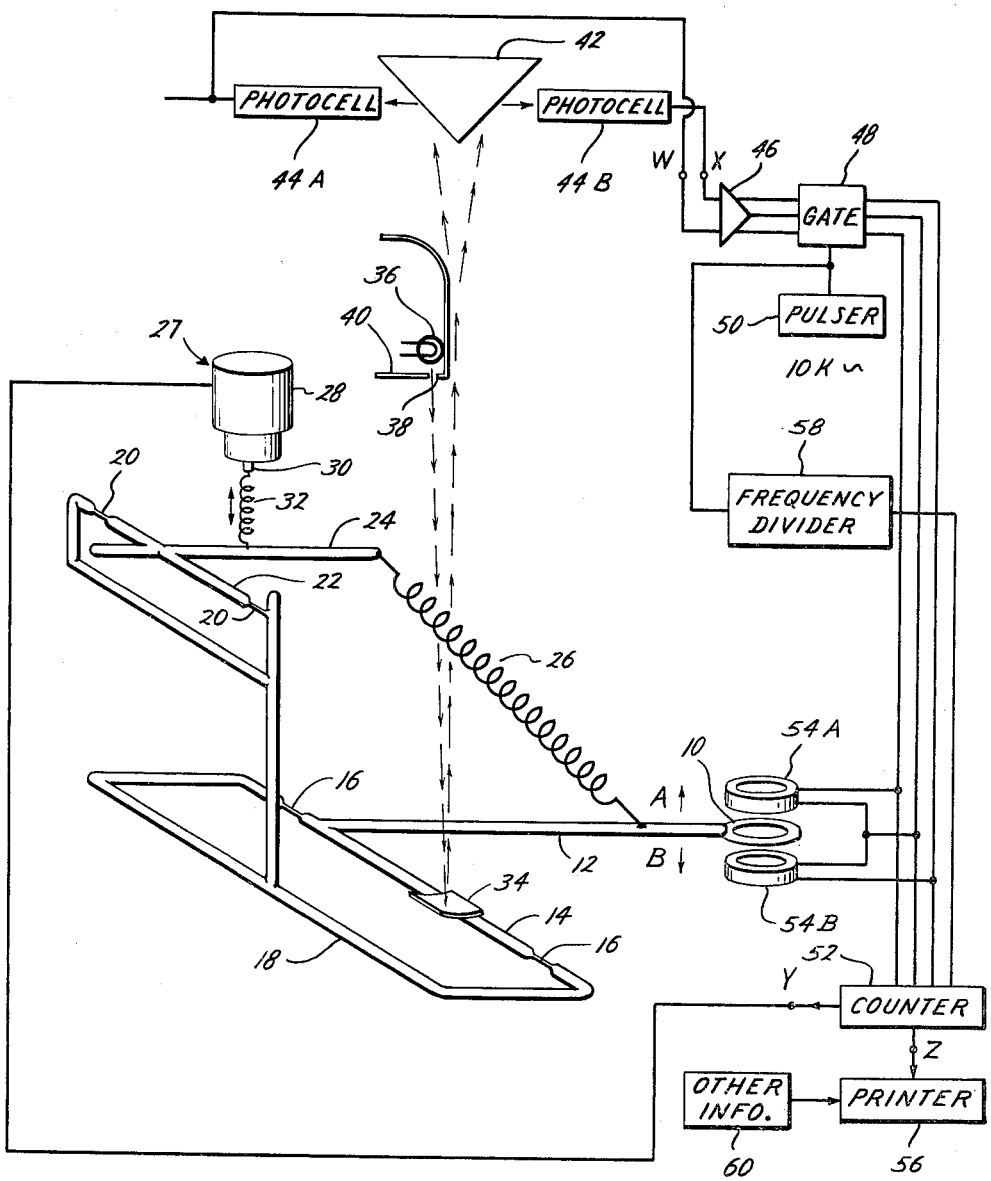

Oct. 12, 1965                S. P. WORDEN                3,211,003
                      DIGITALLY AVERAGED FORCE MEASURING
Filed July 3, 1962                                    2 Sheets-Sheet 1

Samuel P. Worden
INVENTOR.
James F. Weiler
BY Jefferson D. Giller
William A. Stout
Paul L. DeVerter II
ATTORNEYS Oct. 12, 1965  S. P. WORDEN  3,211,003
DIGITALLY AVERAGED FORCE MEASURING
Filed July 3, 1962  2 Sheets-Sheet 2
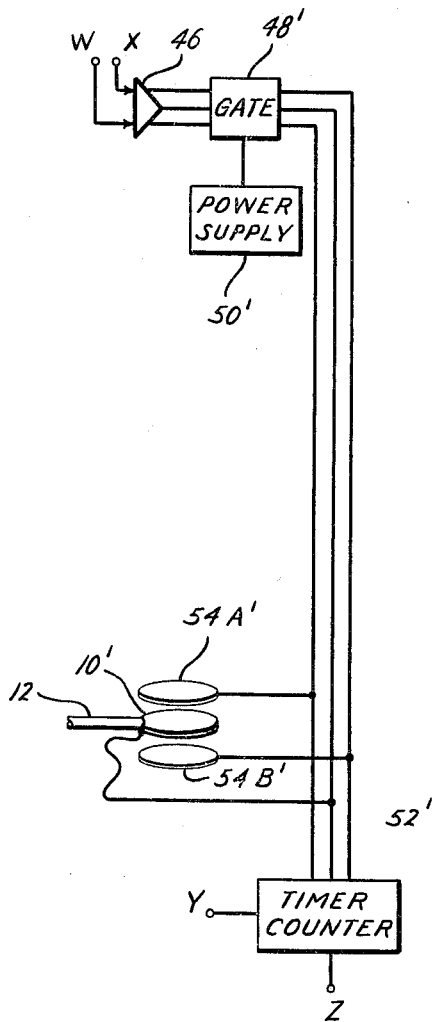
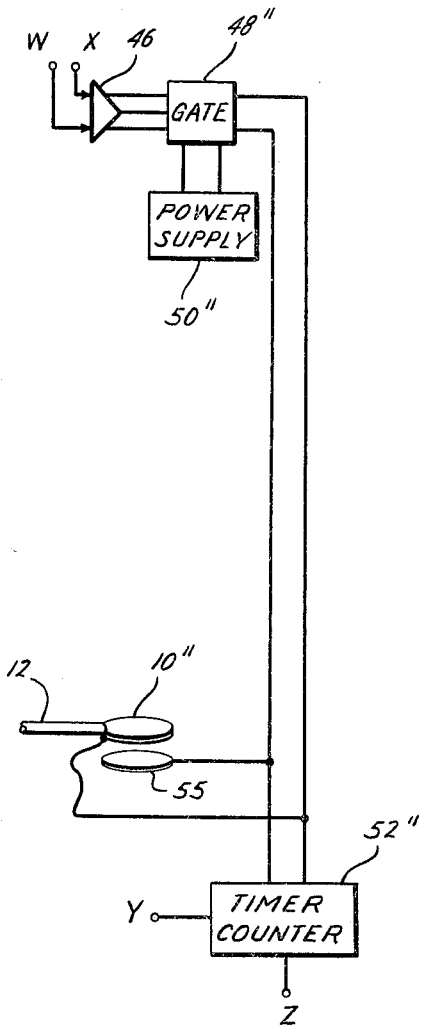
Samuel P. Worden
INVENTOR.

United States Patent Office 3,211,003
Patented Oct. 12, 1965

3,211,003
DIGITALLY AVERAGED FORCE MEASURING
Samuel P. Worden, 695 Rocky River Road,
Houston 27, Tex.
Filed July 3, 1962, Ser. No. 207,217
6 Claims. (Cl. 73—382)

The present invention relates to an improved gravity meter, and more specifically to a force measuring apparatus and method utilizing counteracting force means to counteract the force being measured, wherein said counteracting force is electronically averaged, for particular use in airborne gravity indicating and surveying.

The only areas of the earth in which gravity measurements have been made sufficient to satisfy geodetic requirements are in a few advanced countries, and in those other areas suspected of having petroleum deposits. Almost all areas which are mountainous, swampy, jungle covered, or inundated have yet to be surveyed by gravity meters. At the present time, geodesists are deprived of their most basic methods in the major part of the earth's surface which they must map.

The enormous and difficult areas which have yet to be surveyed demand an apparatus and method which is accurate, rapid, practical, and involves only a reasonable expenditure of time and money. The present invention is directed to an apparatus and method which may be utilized in airborne or waterborne vehicles and therefore satisfy the requirements.

It is therefore an object of the present invention to attain the above advantages through the use of an elastic system which is electrically balanced to average acceleration and other disturbances and includes a periodically adjusted spring balance to average the force of gravity. Further, it is an object of the present invention to indicate the total of the balancing forces utilized at short intervals of time and allow the simultaneous recording and indication of other essential data, such as latitude, longitude, elevation, direction, and speed. Further, the present invention is so designed that the effects of assorted random disturbances may be effectively balanced out.

It is another object of the present invention to provide a force measureing apparatus of the type which includes an elastic system and sensing means to sense differences in the elastic system due to changes in the force being measured, which apparatus includes improvements to provide instantaneous force counteracting means to apply a force to the elastic system to counteract any acceleration which is sensed, summation means to sum the total and direction of any forces which might be applied by the instantaneous force counteracting means, basic or spring balance force counteracting means to apply an accurate force to counteract the force which is sensed, wherein the basic counteracting means is activated in response to the summation means, and indicating means to indicate the instantaneous and basic counteracting forces applied to the elastic system.

Still another object of the present invention is to provide a method of digitally or otherwise electronically averaging the counteracting forces which are applied to an elastic system to maintain the system in balance.

Yet another object of the present invention is to provide a method of digitally averaging the force necessary to maintain the balance of an elastic system which comprises the steps of sensing the differences in the force being measured, as well as the effects of acceleration, applying the necessary instantaneous counteracting forces to restore balance, algebraically averaging the applied instantaneous counteracting forces, applying a basic counteracting force to the elastic system in a direction indicated by the algebraic average of the instantaneous counteracting forces, and indicating the sum of the instantaneous and basic counteracting forces necessary to maintain balance of the elastic system.

Other and further objects, features and advantages will become apparent from the following description of a presently preferred embodiment of the invention, given for the purpose of disclosure, taken in conjunction with the accompanying drawings, where like character references designate like parts throughout the several views, and where:

FIGURE 1 is a schematic representation of a digitally averaged force measuring device according to the present invention, FIGURE 2 is a modification of the instantaneous force counteracting means which may be substituted within the points W, X, Y, and Z of FIGURE 1, and FIGURE 3 is a further modification of the instantaneous force counteracting means similar to FIGURE 2.

When it is desired to measure the force of gravity with a moving airborne instrument, it is essential that the elastic system which is utilized have a short response period, so that differences in displacement of the elastic system may be readily detected. The period of the gravity meter is determined by the relative strength of the restoring force and the inertial moment of the mass. In most modern instruments, the periods vary from 5 seconds to 30 seconds. Typically, the angular position or unbalance of the elastic system is indicated by light reflected from a mirror. The great differences in the period of the various commercial gravity meters arise largely from differences in the ratio of the effective mass to the angular inertia; the ratio depending mainly upon the distance of the center of gravity of the mass from its axis of rotation.

In order to produce a gravity meter capable of anticipating accelerations as large as 50,000 mgl., and yet to average with accuracy on the order of 1 mgl., it is essential that the mass of the elastic system be kept quite small, as well as having only a small displacement of the center of gravity from the axis of rotation. For example, the amount of time required to detect a displacement of 1 mgl. in a gravity meter having a mass arm length of 10 cm., assuming that the minimum angle which can be detected is $10^{-3}$ radians, is approximately $t^2 = 2S/\Delta G = 2 \times 10/1 = 20$ or $t = 4.5$ seconds Similarly, if the length of the mass arm S is reduced to 1 cm., then $t^2 = 2$ or $t = 1.4$ seconds.

In a beam type gravity meter, the maximum extraneous accelerations to which the airborne gravity meter is subjected lie in a transverse horizontal direction, and it is therefore apparent that the mass should extend from the pivot line parallel to the direction of flight. In this manner, error introduced by systematic accelerations during movement will result in very slight displacement of the beam (an effect which is referred to in this art as cross-coupling). Furthermore, to prevent additional cross coupling error it is essential to maintain the beam as nearly as possible in a horizontal position instead of allowing it to be displaced and measuring the effect of the displacement.

To achieve this horizontal disposition and its attendant advantages, means for continuous balancing and measurement of the balancing forces are required. As a heavy mass and large balancing force would be disadvantageous due to bulk and slow response time, the present invention utilizes a light quartz system which is continuously balanced and capable of overcoming accelerations in flight of up to 50,000 mgl. as well as gravity anomalies and other effects. Measurements of gravity to an accuracy of 10 mgl. during random accelerations of upwards of 50,000 mgl. requires an averaging of 1 part in 5,000 or better.

Accuracy such as this cannot be achieved by any usual analog system, consequently the present invention utilizes a digital system to effect the desired results. However, other means of electronically averaging the applied counteracting forces may be utilized, such as with a solion.

With the problems firmly in mind, the present invention may be summarized. Utilizing a digital system of distinct pulses, or time intervals of force, which can be counted, the elastic system may be kept in balance. These instantaneous forces in one direction may be added algebraically to similar forces in the other direction so that random accelerations may be averaged digitally. The direction of the digital average may then be instantaneously transmitted, after a particular interval of time, to the elastic system through a spring balance to effect an accurate semi-permanent or basic correction. The direction of this basic correction is determined automatically by the sign of the digitally averaged sum of the instantaneous forces. Thus, the present invention generally includes a mass suspended on the end of a beam which is pivotally mounted in a suitable structure, such as that disclosed in Worden, Patent No. 2,674,887. The mass may be extremely light and in the preferred embodiment will consist of a single ring or turn of aluminum wire. Through a conventional optical photocell system, such as that disclosed in Gustafsson, Patent No. 2,559,919, differences in displacement of the spring suspended mass may be detected, whereupon, according to the preferred embodiment, suitable pulses are applied to coils which are used to repel the mass, with the particular coil being energized in such a manner as to counteract the effect of any imbalance in the system, due either to acceleration or the effect of gravity so that the elastic system is maintained in its null or balanced position. After a particular interval of time, the algebraic average of the applied pulses is transmitted to a more permanent or basic correction system, in a direction indicated by the sign of the algebraic average. The counting means may also be used to energize an appropriate printer or reading device which will, in the preferred embodiment, print out at periodic intervals the digital average of the applied counteracting forces. This average will be proportional to the force of gravity over the area covered during that interval of time as compared to gravity at a known area, for the effects of acceleration are averaged out.

Referring now to the drawings, and particularly FIGURE 1, the mass 10 here shown as an aluminum ring, is suitably mounted on one end of a beam 12 which is in turn rigidly secured to the spindle 14. Both ends of the spindle 14 are secured by means of beam pivots or hinges 16 to a rigid frame 18, with the rigid frame 18 being suitably secured in an appropriate structure (not shown) similar to that seen in Worden Patent No. 2,674,887.

Also mounted on the frame 18, by means of additional beam pivots 20, is a secondary spindle 22 having an arm 24 secured to the secondary spindle 22. Interconnecting the arm 24 and the beam 12 is an elastic member, such as the spring 26, which functions to support the mass 10. Preferably the arm 24 and beam 12 are in the same vertical plane, and both are mounted approximately horizontally. In the preferred embodiment of the present invention, all of the foregoing items are constructed of fused quartz, with the exception of the mass 10, so as to gain its high dimensional stability. Mounted on a suitable structure (not shown) is the step motor 28 which has a vertically movable shaft 30 operably associated therewith. Interconnecting the shaft 30 and the arm 24 is an additional quartz spring 32 which serves as an additional linkage to support the pivotally mounted arm 24 and therefore beam 12. Although not shown, it should be realized that the foregoing elastic system may include appropriate temperature compensating devices, such as that shown in Cornelison, Patent No. 2,732,718.

Suitably attached to the spindle 14 is a mirror 34. Conventionally mounted in the structure, not shown, is a lamp 36 which when energized produces a beam of light through the slit 38 in the lamp housing 40, which beam of light strikes and reflects from the mirror 34 to intersect an appropriate beam splitter 42. The beam splitter 42 is here shown as a right angle prism which is positioned so that should the beam of light intersect either of the two sides, it will be reflected into an appropriate photocell 44A or 44B. Thus it is seen that if the mass 10 should move upwardly in the direction of the arrow A, the light beam coming from the slit 38 will be reflected by the mirror 34 to the beam splitter 42 and will thereafter energize the photocell 44A. Likewise, should the mass 10 move downwardly, in the direction of the arrow B, the mirror 34 will direct the light beam to intersect the beam splitter 42 so that the light impinges upon the photocell 44B. With suitable adjustment, when the mass 10 is in horizontal position, the beam of light will intersect the beam splitter 42 in such a manner that the photocells 44A and 44B will be equally energized. It is, therefore, readily seen that the foregoing optical photocell system provides a sensing means to determine when the mass 10 is displaced from the horizontal, due either to an effect of acceleration, or to a change in the force of gravity exerted on the mass 10. The sensing means further notes the direction of displacement.

The electrical output of the photocells 44A and 44B is directed to a conventional amplifier 46, which may include appropriate balancing means to equate the output of either photocell for the same angle of deviation of the mass 10 in either direction. Thereupon, the output on the amplifier 46 is led to the conventional gate circuitry 48. Also electrically connected to the gate 48 is a conventional oscillator-pulser 50. The oscillator-pulser may include any known means to produce uniform pulses at any desired frequency. In accordance with the present invention, it is preferred to produce pulses of 10 kilocycles per second (kc.). A convenient manner of producing 10 kc. pulses is to utilize a conventional 100 kc. crystal control oscillator in combination with a frequency divider and appropriate wave shaping circuits. The only purpose in using a 100 kc. crystal, instead of a 10 kc. crystal, is because of its lower bulk and cost. In any event the pulses from oscillator-pulser 50 are fed to the gate 48.

The function of the gate 48, which acts much as a 2-way valve, is to direct the pulses from the pulser 50 to the counter 52 and to the appropriate coil 54A or 54B. In any event, the gate 48 compares the amplified output of the photocells 44A and 44B to determine which has produced the higher amplitude. Thereupon, the gate 48 directs the pulses from the pulser 50 to either coil 54A or 54B in order that the mass 10 may be repelled, and thus moved back to the balance or null position. For example, if the beam 12 moves in the direction of the arrow A, then the mirror 34 is so tilted that the light beam intersects the beam splitter 42 in such a position as to energize the photocell 44A. The output of the photocell 44A is then directed through the amplifier 46 to the gate 48 which compares the output of both the photocell 44A and 44B. When the gate 48 determines that the amplitude of the signal from the photocell 44A is greater, it directs the pulses from the pulser 50 through appropriate electrical connections to the coil 54A, wherein the pulses repel the mass 10, and therefore the beam 12, away from the coil 54A. This repulsion will continue until the amplitude of the signals received by both the photocells 44A and 44B are equal, indicating that balance has been restored in the elastic system. This, then comprises the pulse counteracting force means which is capable of providing large range acceleration nulling instantaneously.

The operation of the repulsion coils 54A and 54B, in combination with the aluminum ring mass 10 is somewhat similar to that which has previously been described in the patent to Worden et al., No. 2,738,676, with particular reference to FIGURE 4 of that patent. However, the present invention utilizes two coils to which pulses are applied to maintain constant balance of the mass instead of an alternating current to replace the small spring and dial as a means for remotely reading the dial, as in a bore hole. Physically, the coils 54A and 54B are suitably attached in a fixed position to the structure (not shown) and may include appropriate ferrite cores. In accordance with the present invention, it is contemplated that the maximum vertical displacement of the beam 12 will not exceed .03 inch. Furthermore, it is presently contemplated that each pulse from the pulser 50, when applied to the appropriate coil 54A or 54B, will displace or repulse the mass 10 the equivalent of 1 mgl. This, of course, may be easily accomplished by appropriately controlling the energy content of the pulses in a conventional manner in the pulser 50. Obviously, other suitable values may be utilized.

The digital averaging means, here shown as the counter 52, determines the number of pulses which have been applied to either coil 54A or coil 54B and then determines the algebraic difference instantaneously. For example, if 100 pulses are applied to coil 54A and 90 pulses are applied to coil 54B, then the counter 52 keeps a running digital sum which would indicate that the net effect of all of the pulses which were applied is 10 pulses to coil 54A. At pre-set time intervals this information is sent to an indicating means, such as the printer 56, which in a conventional manner places the information on an appropriate magnetic tape, or any other form of read out device. Physically, the counter 52 may consist of conventional electronic decade counting tubes. In the preferred embodiment of the present invention, it is advantageous to utilize conventional flip-flop counting circuits.

At pre-set time intervals, and in the preferred embodiment, intervals of 100 seconds, the digital sum is sent not only to the printer 56 but an appropriate pulse is also sent to the basic counteracting force means 27, here shown as the step motor combination. Timing for the appropriate interval may be conventionally accomplished by the use of one or more frequency dividers 58 attached to the output of the pulser 50 and interconnected with the counter 52. The frequency divider 58 may consist of 6 decimal units connected in series which will therefore reduce the 10 kc. input to 1 cycle every 100 seconds, thus attaining the preferred frequency of operation of the basic counteracting force means 27 previously noted.

The step motor 28 may consist of any device capable of moving the shaft 30 a predetermined increment or distinct step for each pulse applied to the step motor. However, in the present application the step motor 28 must also be capable of moving in either of two directions, so that the tension applied to the spring 32 and pivot arm 24 may be increased or decreased. Although conventional and appropriate step motors are commercially available, it is presently preferred to utilize oppositely disposed electromagnets with ratchets and pawls which will turn an appropriate screw and therefore translate an appropriate traveling nut, to which the shaft 30 is attached. In the presently preferred embodiment of the invention, one pulse to the step motor 28 would result in a displacement of the beam 12 and mass 10 of 10 mgl. Thus, it is seen that each pulse of the pulsing coils 54A and 54B result in the displacement of 1 mgl. while the basic counteracting force means operated by the step motor 28 results in the displacement of 10 mgl. for each operation thereof.

Utilizing the step motor 28 as described, it is therefore apparent that the number of pulses sent at predetermined intervals by the counter 52 to the printer 56 is not important to the basic counteracting force means, but only the direction is important. Therefore, continuing the previous example, if the counter after 100 seconds of operation, determines that an arithmetic average of 10 pulses of 1 mgl. each are necessary to restore balance to the elastic system, and that the digital sum of these pulses has been applied to coil 54A, then this direction information is transmitted by the counter 52 to the step motor 28 which moves the shaft 30 in such a direction as to allow the beam 12 and mass 10 to move downwardly from the coil 54A a distance equivalent to 10 mgl. The fact and direction of this accurate adjustment to the elastic system by the step motor 28 is also transmitted by the counter to the printer 56 where this information is likewise recorded or indicated.

The basic counteracting force means 27 comprises the step motor 28 with its movable shaft 30, the spring 32, arm 24 and spring 26, and may be generally referred to as a spring balance. This spring balance system is utilized to measure the changes in the force of gravity because of its great accuracy and ease of calibration. Thus, the effect of one impulse to the step motor 28 may be conventionally calculated in a forthright manner with knowledge of the various lever lengths, screw leads and angular rotation. On the other hand, the pulses to the pulse counteracting force means are utilized primarily to immediately counteract the effects of acceleration and random disturbances, and only secondarily to indicate the force of gravity. The reason lies in the effect that small variations in the strength of the pulses, if used to measure gravity, could produce substantial error; whereas, when used to null accelerations there will be substantially the same number in both directions, hence, inconsistencies will be effectively canceled out.

The advantage of sending information to the printer at pre-set intervals becomes apparent when it is recognized that to properly interpret the data accumulated by the digitally summed force measuring device of the present invention, other information is needed, such as altitude, speed, direction, longitude and latitude. Therefore, if information is sent to the printer at intervals of approximately 100 seconds, and the transmission and recordation of this information takes only 20 seconds, then approximately 80 seconds are left during the time interval in which the printer 56 may be utilized to record other information from appropriate sources 60.

To calibrate the device of the present invention, the step motor 28 may be energized by the use of a single impulse through an appropriate test circuit, and then locked, thus resulting in an imbalance in the elastic system. Thereupon, the number of pulses to the appropriate coil 54A or 54B may be counted, to determine the amount or ratio necessary to restore balance. Thereby, knowing the counteracting force effect of one basic step, the value of one pulse may be determined. Furthermore, if the number determined is inconvenient to work with, then the energy level of these pulses may be adjusted in a conventional manner at the pulser 50.

Referring now to FIGURE 2, a modification of the instantaneous force counteracting means is shown. In this and other figures in the drawings, like numbers are utilized for like parts, and prime and double prime marks are utilized to distinguish modified parts. The schematic representations of FIGURES 2 and 3 are designed to be substituted between the points W, X, Y, and Z of FIGURE 1.

As an alternative to the use of distinct pulses of force to maintain the elastic system in balance instantaneously, the modification of FIGURE 2 may be utilized. Just as distinct pulses may be digitally averaged, so may the units of time in which a constant force is applied to restore balance to the elastic system. Thus, if a repulsion force is applied downwardly upon the elastic system for 300 microseconds, and an opposite and equal repulsion force is applied upwardly upon the elastic system for 290 microseconds, the algebraic average of these forces is 10 microseconds downwardly. From the foregoing it is readily seen that a means of producing a repulsion force is necessary, as well as a means of measuring the length of time that it is applied.

Referring now to FIGURE 2, when the sensing means photocells 44a and 44b determine that an imbalance in the elastic system exists, an appropriate signal is sent through points W or X to the conventional amplifier 46, and from there to the gate circuitry 48. Electrically connected to the gate circuitry is a power supply 50' which supplies a constant electrical energy level. As before, the gate 48 acts as a 2-way valve in response to the activated photocell 44a or 44b and directs the energy from the power supply 50' to the appropriate plate 54a' or 54b'. Forming a part of, and suspended between the plates 54a' and 54b' is a mass 10', also being a plate. As shown in FIGURE 2, the plate 10' is electrically connected to the gate 48. The plate 54a' and 54b' and 10' act as electrostatic repulsion devices, wherein it is seen that if plate 10' and plate 54a' are supplied with the same potential, a repulsion force is generated, which will move the beam 12 in response thereto. Likewise, if repulsion potential exists between plate 10' and plate 54b', the beam 12 will be oppositely moved.

Also electrically connected to the gate 48 and the plates 54a' and 54b' is a conventional algebraic timer counter 52' which functions to provide a digital average as to the time a potential is supplied to either plate 54a' or 54b', which information is at intervals sent through point Z to the printer 56. Likewise, the algebraic timer counter 52', at intervals, sends a pulse through point Y to the basic force counteracting means 27 to effect a more permanent or basic correction in the elastic system, and likewise supplies this information to the printer through point Z.

Similarly, and referring now to FIGURE 3, it is apparent that instead of utilizing repulsion plates 54a' and 54b' for each direction, a single plate 55 may be substituted therefor, if the circuitry is conventionally required so that both attraction and repulsion forces may be utilized in conjunction with the elastic system. In this instance, the gate 48 acts in a manner somewhat similar to a single-pole double-throw reversing switch whereby upon appropriate signals from the sensing means, the potential between the plate 55 and the plate 10" of the elastic system, may be reversed to provide either attraction or repulsion forces.

Although the method of the present invention is felt to be apparent from the foregoing discussion, the following summary is presented. The method of digitally averaging force generally comprises the steps of balancing the elastic system, sensing imbalances in the elastic system applying instantaneous counteracting forces to the elastic system to restore balance, arithmetically averaging the applied instantaneous counteracting forces, applying a basic counteracting force in steps to the elastic system at intervals in a direction determined by the arithmetic average of the instantaneous counteracting forces, and indicating the sum of the instantaneous and basic counteracting forces necessary to maintain balance in the elastic system. The presently preferred apparatus for the practice of the method has been described hereinabove, however, other suitable devices may be utilized.

Therefore, it is seen that the present invention advantageously provides a digitally average force measuring device and method which is capable of responding quickly to changes in the force of gravity, or to extraneous accelerations inadvertently introduced, and which will provide both instantaneous acceleration counteracting force control as well as accurate basic counteracting force control. Furthermore, through the use of the present invention, the effects of cross-coupling error are substantially reduced, if not eliminated, thereby providing an instrument especially suited for vehicular use.

The present invention, therefore, is well adapted to carry out the objects and attain the ends and advantages mentioned, as well as others inherent therein. While a presently preferred embodiment of the invention has been given for the purpose of disclosure, numerous changes in the details of construction, and in the combination, shape, size, arrangement of parts, and uses may be resorted to without departing from the spirit and scope of the invention as hereinafter claimed.

What is claimed is:

1. In a digitally averaged force measuring apparatus,
 (a) an elastic force responsive system,
 (b) sensing means responsive to the force imbalance in the elastic system,
 (c) first counteracting force means responsive to the force imbalance sensed by the sensing means and arranged to apply forces instantaneously to the elastic system to counteract sensed imbalance,
 (d) summation means responsive to the applied forces of the first counteracting force means and arranged to algebraically average said forces,
 (e) second counteracting force means responsive to the algebraic average determined by the summation means and arranged to apply additional counteracting forces to the elastic system, and
 (f) indicator means indicating both of the applied counteracting forces.

2. In a digitally averaged force measuring apparatus,
 (a) an elastic force responsive system,
 (b) sensing means responsive to the force imbalance in the elastic system,
 (c) counteracting pulse forces means responsive to the force imbalance sensed by the sensing means and arranged to apply pulses of force to the elastic system instantaneously to counteract sensed unbalance,
 (d) interval summation means responsive to the applied pulses of the counteracting pulse force means, arranged to digitally average forces applied by the pulse force means and sum at intervals the average forces applied,
 (e) basic step counteracting force means responsive to the interval sum of the summation means and arranged to apply force in steps at intervals to the elastic system to counteract imbalance indicated by the interval summation means, and
 (f) indicator means indicating both of the applied counteracting forces.

3. In a force measuring apparatus of the type including a force responsive elastic system, sensing means to determine the force imbalance in the elastic system and repulsion coils adapted to apply counteracting force to restore balance in the elastic system, the improvement comprising,
 (a) pulsing means responsive to the force imbalance sensed by the sensing means and arranged to instantaneously apply pulses to the repulsion coils in a direction to restore balance in the elastic system,
 (b) pulse counting means responsive to the pulsing means and arranged to algebraically average the number and indicate at intervals the direction of the average of the pulses applied to the repulsion coils to restore balance,
 (c) step counteracting force means responsive to the average direction of applied pulses indicated by the pulse counting means and arranged to apply steps of counteracting force to the elastic system in a direction to counteract indicated average imbalance, and
 (d) indicating means indicating the number and direction of steps of counteracting force applied and the algebraic average of pulses applied to the elastic system.

4. In a digitally average force measuring apparatus, a support, a beam pivoted to the support for vertical movement, a mass fixed to the beam, a spring yieldingly supporting the beam and mass horizontally, a mirror mounted to pivot with the beam, a light beam source arranged to reflect a light beam from the mirror, a light beam splitter mounted in the path of the reflected light beam and arranged to direct the reflected light beam in either of two directions upon vertical movement of the pivoted beam, first and second photocells mounted to receive the reflected light beam directed in either direction by the beam splitter, a pulse generator, first and second repulsion coils mounted in electromagnetic relationship with the mass, and arranged to repulse the mass in either vertical direction when energized with pulses, a gate circuit electrically interconnecting the pulse generator, photocells and repulsion coils and arranged to direct pulses from the pulse generator to the first repulsion coil when the first photocell receives the greater reflected light and to direct pulses from the pulse generator to the second repulsion coil when the second photocell receives the greater reflected light, a counter electrically connected to the repulsion coils and arranged to algebraically average the pulses applied to the repulsion coils, printing means electrically connected to the counter and arranged to print the algebraic average when said printing means is activated, an interval timer electrically connected to the counter and printing means and arranged to activate the printing means at intervals, and a step motor electrically connected to the counter and timer and mechanically connected to the pivoted beam and arranged to vertically move the pivoted beam and mass a distinct step at intervals determined by the timer in a direction to counteract the algebric average indicated by the counter, said printing means interconnected through said counter with the step motor and arranged to print the occurrence and direction of the step motor beam movement.

5. The invention of claim 4 including means associated with said printing means arranged to indicate other information between said timed intervals.

6. A method for determining changes in the force of gravity by determining the force necessary to restore balance to a force responsive elastic system unbalanced by the force of gravity and assorted random forces comprising the steps of:

(a) initially balancing the forces acting on the elastic system, (b) sensing subsequent force imbalance in the elastic system, (c) continuously pulsing the elastic system with forces to counteract sensed force imbalance, (d) digitally averaging the applied pulses, (e) indicating the direction of the digital average at intervals, (f) translating the elastic system to counteract imbalance intervally indicated, (g) and recording the translated and digitally averaged counteractions.

References Cited by the Examiner

UNITED STATES PATENTS

| | | | |
|---|---|---|---|
| 2,597,899 | 5/52 | Payne | 73—398 |
| 2,738,676 | 3/56 | Worden et al. | 73—382 |
| 2,809,524 | 10/57 | Masterson | 73—382 |
| 2,968,952 | 1/61 | Stalder | 73—517 |
| 2,977,799 | 4/61 | La Coste | 73—382 |
| 2,988,737 | 6/61 | Schroeder | 73—517 |
| 3,131,564 | 5/64 | Romberg | 73—517 X |

RICHARD C. QUEISSER, *Primary Examiner.*

DAVID SCHONBERG, *Examiner.*